Jan. 19, 1932.  L. D. HOULIS  1,841,813
BAKING OVEN
Filed Jan. 19, 1931   2 Sheets-Sheet 1
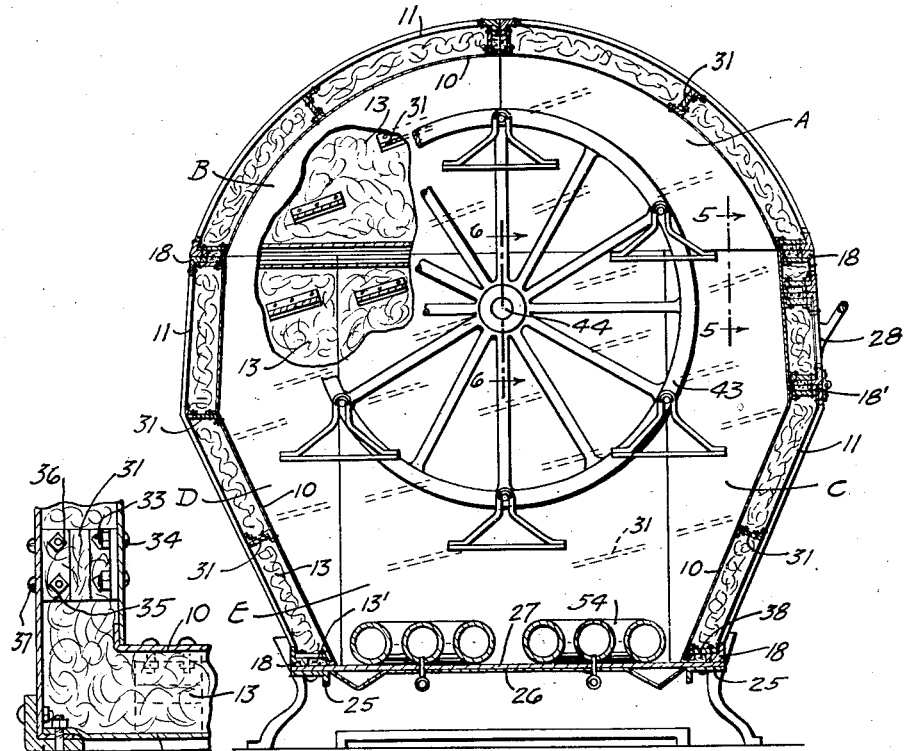
Fig. 1
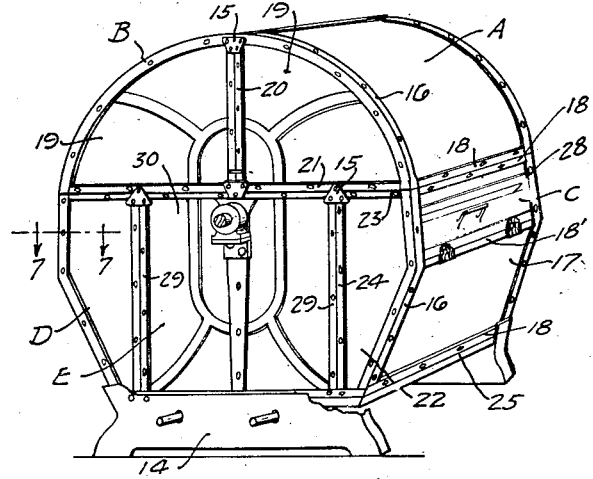
Fig. 7
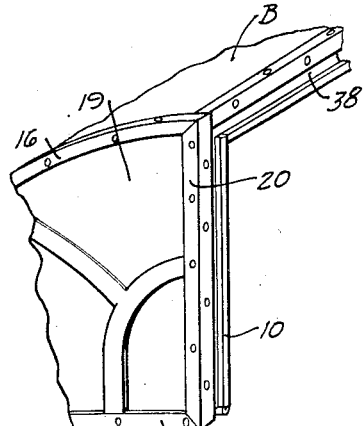
Fig. 2
Fig. 9
Inventor
Louis D. Houlis
By Jack A. Ashley
Attorney Jan. 19, 1932.  L. D. HOULIS  1,841,813
BAKING OVEN
Filed Jan. 19, 1931  2 Sheets-Sheet 2

Inventor
Louis D. Houlis
By
Jack A. Ashley
Attorney

Patented Jan. 19, 1932

1,841,813

UNITED STATES PATENT OFFICE

LOUIS D. HOULIS, OF DALLAS, TEXAS

BAKING OVEN

Application filed January 19, 1931. Serial No. 509,766.

This invention relates to new and useful improvements in baking ovens.

One object of the invention is to provide an improved oven wherein the heat will be more evenly distributed and better conserved.

A particular object of the invention is to provide an oven comprising inner and outer metallic shells completely insulated from each other so as to prevent heat exchange.

Another object of the invention is to provide inner and outer metallic shells having a heat insulating packing therebetween and connected by non-metallic members.

A construction designed to carry out the invention will be hereinafter described together with other features of the invention.

Figure 3:
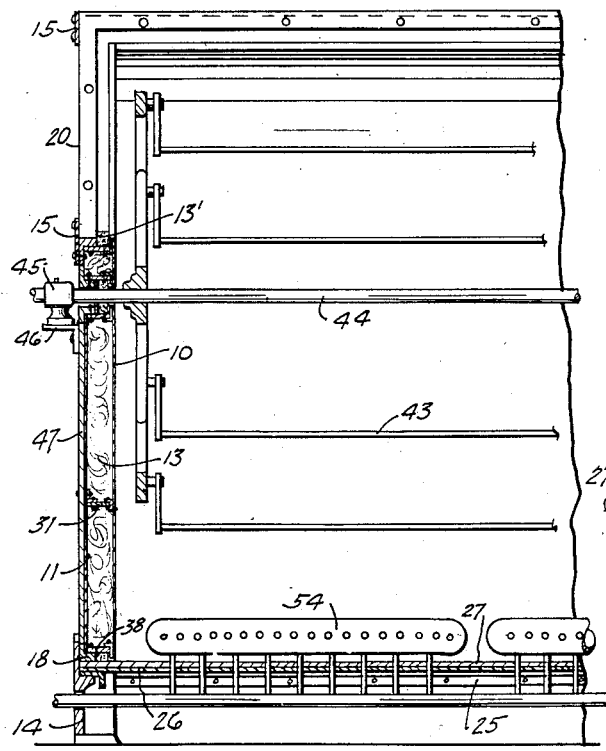
Figure 4:
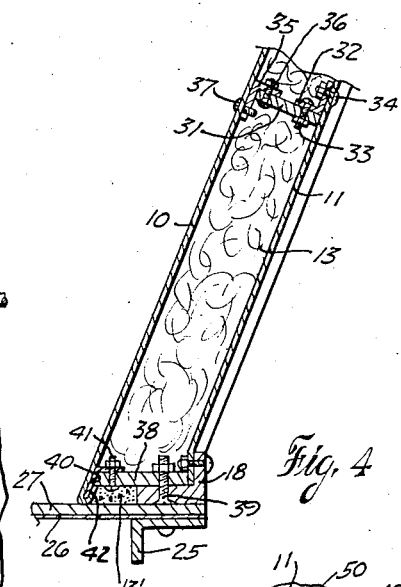
Figure 8:
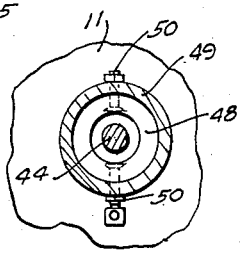
Figure 5:
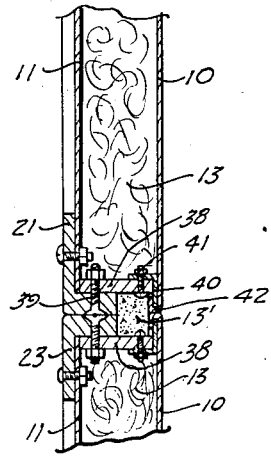
Figure 6:
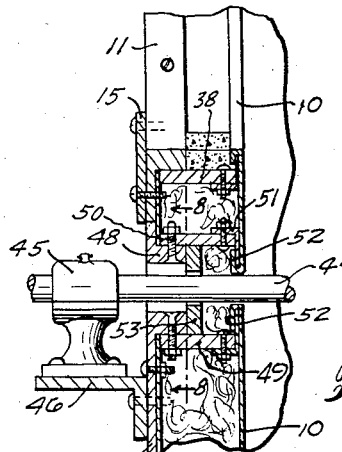

The invention will be more readily understood from a reading of the following specification and by reference to the accompanying drawings in which an example of the invention is shown, and wherein:

Figure 1 is a transverse vertical sectional view of an oven constructed in accordance with the invention, Figure 2 is an isometrical view of the same, Figure 3 is a partial longitudinal sectional view of the oven, Figure 4 is a sectional detail of the base joint, Figure 5 is an enlarged sectional view taken on the line 5—5 of Figure 1, Figure 6 is an enlarged vertical sectional view taken on the line 6—6 of Figure 1, Figure 7 is a horizontal cross-sectional view taken on the line 7—7 of Figure 2, Figure 8 is a vertical sectional view taken on the line 8—8 of Figure 6, and Figure 9 is an isometrical view of one of the top sections.

In the drawings the numeral 10 designates an inner metallic shell or lining and 11 an outer metallic shell or jacket. These shells are preferably formed of sheet metal and are spaced apart so as to provide suitable walls and cavities for the reception of insulating material 13, which is packed in the spaces between the walls. This insulating material may be of any suitable character and is used for the purpose of preventing heat exchange so that an even and constant temperature may be contained within the oven and the heat conserved. Asbestos fibre or by-products having heat insulating properties, or any other material suitable for the purpose may be used.

In constructing the oven, it is given any suitable shape and for the purposes of illustration I have shown the forms set forth in Figures 1 and 2. In order to easily transport the oven and pass it through narrow doorways, it is made in sections; but the particular shape and arrangement of these sections is largely a matter of choice and mechanical designing.

In Figures 1 and 2 the oven is composed of top sections A and B extending longitudinally of the oven and quadrant shaped in cross section. These top sections are mounted on vertical side sections C and D between which end sections E are disposed. The end sections and the ends of the side sections are mounted on transverse base members or bottom supports 14. The sections are matched together and connected by gusset plates 15 suitably bolted thereto. As before stated the exact sectional divisions are subject to variation and the invention resides in the structure of the walls rather than in the sectional divisions.

The sections A, B, C and D each comprise angular corner members 16 bent to the shape necessary for the particular section. In each section the corner members are connected by and overlap longitudinal outer metal sheets 17 bent to fit said members. The upper and lower ends of the corner members 16 are connected by longitudinal angle bars 18, which are suitably welded or otherwise fastened to the corner members so as to form a butt-joint therewith. The top sections A and B have outer metal end sheets 19 conforming to the shape of the corner members and secured to the upright angle bars 20 and horizontal bottom bars 21. The metal sheets 17 and 19 form part of the outer shell 11.

The side sections C and D have outer metal sheets 22 at their ends shaped to fit the corner members 16 of said sections and extending into top angle bars 23 and upright angle bars 24. The angle bars 23 are fastened to the corner members flush therewith and the angle bars 24 are fastened flush with the bars 23 at their upper ends. The lower ends of the bars 16 and 24 are suitably fastened in flush relation and are seated in the base members 14. The base members are connected by tie bars 25 which support a transverse bottom sheet 26 and upon which a sheet or plate 27 of insulating material is mounted. As is shown in Figures 1 and 4, the bottom angle bars 18 of the sections C and D rest upon the plate 27.

It will be seen that the plate 27, being a non-conductor of heat, heat exchange between the metal parts of the sections C and D and the base parts 14 and 25 is prevented. It is further pointed out that the plate 27 is composed of a suitable fire-proof material which is also a non-conductor of heat and of course is non-metallic. In the section C an intermediate angle bar 18' is fastened to the corner member 16 and a suitable door 28 is hinged thereto, as is shown in Figures 1 and 2.

The sections E include rectangular metal frames 29, angular in cross-section like the bars 21 and 24, and each frame receives an outer metal sheet 30 forming part of the outer shell 11. When the sections are assembled, the lower sections C, D and E rest upon the plate 27, which is carried by the base members 14 and the bars 25 and the upright angle bars 24 engage and lie flush with the uprights of the frames 25. The bottom bars 21 of the top sections lie flush with and rest upon the top bars 23 and the top bars of the frame 29, while the upright bars 20 of the top sections contact with each other and lie flush.

From the foregoing it will be seen that the oven, being constructed in a number of sections, each of said sections may be passed through a narrow doorway or other opening in the building in which the oven is to be erected. The sections also make for easy transportation. When the sections have been delivered they may be assembled and fastened with the gusset plates 15.

The inner shell 10 is cut to conform to the sectional divisions and it is believed that a description of one section will properly explain all. The inner metal sheet 10 is spaced a substantial distance from the outer metal sheet or shell 11, as before described. To hold these sheets in spaced relation, I provide spacers or braces therebetween, as shown in Figure 1 in full and dotted lines, and such spacers may be located at such points as are found desirable and advantageous. It is preferable to stagger these spacers so that they will prevent the packing 13 settling and will also support it in place.

Each spacer comprises a strip 31 of non-metallic material which is preferably of fire-proof character and like the plate 27 may be made of any substance suitable for the purpose; a pressed asbestos composition having been found satisfactory. The strip is connected to the outer shell 11 by an angular clip 32 suitably fastened to the strip by bolts 33 and to the shell by bolts 34. A similar angular clip 35 (Figure 4) is secured to the opposite side of the strip by bolts 36 and overhangs the edge of the strip so as to engage the inner side of the inner shell 10 to which it is secured by screw bolts 37. This enables the packing material 13 to be inserted and the inner shell 10 afterwards placed in position.

The margins of the sections are formed by securing strips 38 of non-conducting material similar to the strips 31 to the angle bars 18, 18', 20, 21, 23, 24 and the frame 29, as is indicated in Figures 4, 5 and 9, as well as in other figures of the drawings. One side of the strip 38 is fastened to the bar by bolts 39. On the opposite side each strip 38 has an overhanging metallic clip 40 fastened thereto by a bolt 41. The edge portion 42 of the inner shell 10 is crimped around the clip 40 so that the margin of the shell section is thus secured in place. The strips 38 hold the packing 13 in the sections and they also provide non-metallic connections between the inner and outer shells. When the sections are assembled fire-proof cement 13', as is shown in Figure 5, is filled in between the abutting edges and this cement being of heat resisting material, is also a non-conductor of heat. The cemented joints co-act with the gusset plates 15 in holding the sections together.

A baking reel 43 is mounted on a longitudinal shaft 44 which projects through the end sections E and is journaled in bearing boxes 45 mounted on brackets 46, which in turn are fastened on upright standards 47 extending from the top to the bottom members of the frame 29 and suitably fastened thereto in butt-joint relation. As shown in detail in Figure 6, each standard 47 has an inwardly directed collar 48 on its inner side which is surrounded by a box 49 of non-conducting material like the strips 38. The box is fastened to the collar by bolts 50 and has bolted on its inner end a clip 51 which extends inwardly of the box. The inner shell 10 is cut and provided with a flange 52, which is crimped around the inner edge of the clip 51 so as to provide a circular opening for the shaft 44. A non-metallic washer 53 is inserted in the box against the collar and fits snugly around the shaft 44 so as to retain the packing material 13 which is placed in the box.

It will be seen that the inner and outer shells are thoroughly insulated from each other and the whole structure is such as to conserve the heat. I have shown burners 54 in the bottom of the oven, but the manner of heating is not within the scope of the invention.

While I have described the outer shell 11 as being made of sheet metal, I do not wish to so limit the invention, and it is to be understood that the outer shell 11, of which the outer panels of the sections are formed, may be made on non-metallic material, such as compressed asbestos board or other sheet material which is a non-conductor of heat.

While the invention has been illustrated in connection with a baking oven, it is to be understood that the invention may be applied to any heat exchange device.

Various changes in the size and shape of the different parts, as well as modifications and alterations, may be made within the scope of the appended claims.

Having illustrated and described a preferred form of the invention, what I claim is:

1. In a baking oven, an inner metallic shell, an outer metallic shell spaced from the inner shell, non-metallic connections between the shells, heat insulating packing between the shells, the oven consisting of a base and an upper structure, and a horizontal non-metallic plate mounted on the base and on which the upper structure is supported.

2. A baking oven as set forth in claim 1 in which the upper structure is formed into sections having angle marginal members, and means for securing the angle members together.

3. In a baking oven, a pair of longitudinal top sections including arcuate tops and right-angular ends secured thereto, vertical side sections including angular ends on which the top sections are mounted, upright end sections between the ends of the side sections and on which the top sections are mounted, means for securing the top sections together, means for securing the top sections and the end sections together, and means for securing the top, end and side sections together, all of said means being removable, whereby said sections may be separated.

4. An oven as set forth in claim 3 in which each section is formed of inner and outer metallic sheets and connected by non-metallic members at their margins.

5. An oven as set forth in claim 3 and a base, and means for securing the side and end sections to the base.

6. An oven as set forth in claim 3 in which each section is formed of inner and outer metallic sheets and connected by non-metallic members at their margins, a base, and a non-metallic plate mounted on the base transversely thereof and upon which the side and end sections are mounted.

7. In an oven, insulated walls including inner and outer metallic sheets connected by non-metallic strips, inwardly directed collars at each end of the oven, the inner sheet having an opening opposite each collar, a reel shaft passing through the collars and the sheet openings, non-metallic boxes surrounding the collars and the shaft between the sheets, means for fastening each box in place, and a packing in each box surrounding the shaft.

In testimony whereof I affix my signature.

LOUIS D. HOULIS.